L. N. KELLY.
AUTOMOBILE WHEEL SLED.
APPLICATION FILED OCT. 20, 1917.
1,313,823. Patented Aug. 19, 1919.
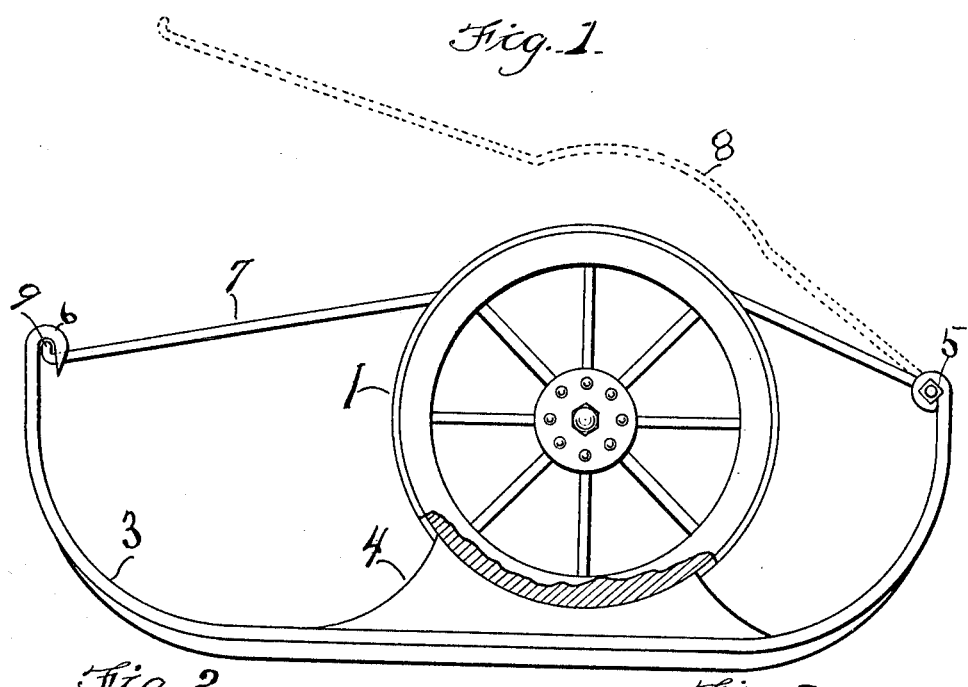
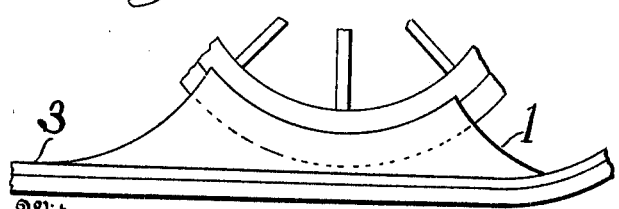
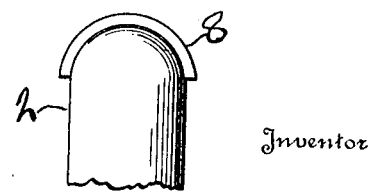

UNITED STATES PATENT OFFICE.

LOUIS N. KELLY, OF LANCASTER, NEW YORK.

AUTOMOBILE-WHEEL SLED.

1,313,823.   Specification of Letters Patent.   Patented Aug. 19, 1919.

Application filed October 20, 1917. Serial No. 197,703.

*To all whom it may concern:*

Be it known that I, LOUIS N. KELLY, a citizen of the United States, residing at Lancaster, in the county of Erie and State of New York, have invented certain new and useful Improvements in Automobile-Wheel Sleds, of which the following is a specification.

My invention relates to sleds, and particularly to that class known as wheel sleds.

The object of my invention is to provide a wheel sled for automobile wheels, having a clamping member by which the sled may be rigidly and quickly secured on the wheels.

A further object of my invention is to provide a wheel sled having a steel shoe or runner provided with wheel rest secured on the runner to receive the wheel and a clamping bar adapted to fit over the top of the wheel so that the wheel may be clamped between the wheel rest and clamping bar.

A further object of my invention is to provide a wheel sled having a resilient clamping bar which may be readily and easily placed on the wheel or removed, without unnecessary loss of time or the use of hooks, whether the wheel is provided with a tire or not.

Finally the object of my invention is to provide a wheel sled of the foregoing described type which will possess advantages in point of simplicity and efficiency, consisting in the details of construction and in arrangement of parts to be hereinafter more fully set forth and particularly claimed.

In describing my invention in detail, reference will be had to the accompanying drawing, forming a part of this specification, wherein like characters denote corresponding parts in the several views, and in which:

Figure 1 is a perspective view in elevation showing a separate clamping bar.

Fig. 2 is a fragmentary view showing the wheel rest, and

Fig. 3 is a plan view showing the concave portion of the clamp rod on the tire.

In the drawings, 1 indicates an automobile wheel which may be of any of the ordinary makes, and provided with a pneumatic tire 2, but it may be provided with a tire of any construction desired, or the tire may be completely removed when the rectangular formed surface of the rest is to be used.

I provide a runner 3, made of iron or steel or any suitable material best adapted to such purposes, with a wheel rest 4 suitably secured thereto. At one end of the runner 3, an eye is formed as at 5, and at the opposite or rear end of the runner, a hook shaped portion 6, the purpose of which will be hereinafter more fully explained. A clamping bar 7 having a semicircular shape portion 8 and which is concave in cross-section or rectangular to fit the wheel rim should the tire be absent, so that it will fit the tire or rim of the wheel, is pivotally connected to the eye 5 of the runner at one end, and provided with an arm 9 at its opposite end. The wheel rest has a semi-circular shaped surface in order that it may fit closely the tire of the wheel, or a rectangular surface to fit a wheel provided the tire be absent.

In order to apply my sled to an automobile or any similar vehicle wheel, the wheel is placed on the rest 4 and the clamping member brought down over the top of the tire 2 and its opposite end secured under the hook shaped member 6 thereby clamping the wheel rigidly on the runner 3.

It is thought that the operation and construction of my improved wheel sled may be fully understood from the foregoing description, it being noted that changes may be made in the details and proportions without departing from the scope of my invention.

What I claim as new and desire to secure by Letters Patent is:—

In an automobile wheel sled, a steel runner provided with a wheel rest having a grooved semi-circular surface adapted to receive a wheel and prevent longitudinal movement of same, a clamping bar pivotally connected to one end of said runner and adapted to engage a hook shaped member formed on the opposite end of said runner, said clamping bar having a semi-circular portion provided with a concaved surface adapted to engage the upper portion of the wheel.

In testimony whereof I affix my signature in the presence of two witnesses.

LOUIS N. KELLY.

Witnesses:
ELLIS E. BURDICK,
CELIA D. BAUER.